(12) United States Patent
Inazumi

(10) Patent No.: US 7,751,646 B2
(45) Date of Patent: Jul. 6, 2010

(54) IMAGE PROCESSING METHOD, IMAGE PROCESSING PROGRAM, RECORDING MEDIUM, AND PROJECTOR

(75) Inventor: Mitsuhiro Inazumi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 820 days.

(21) Appl. No.: 11/672,370

(22) Filed: Feb. 7, 2007

(65) Prior Publication Data

US 2007/0188715 A1 Aug. 16, 2007

(30) Foreign Application Priority Data

Feb. 15, 2006 (JP) ............................. 2006-038404

(51) Int. Cl.
*G06K 9/64* (2006.01)
(52) U.S. Cl. ...................... 382/276; 382/128; 382/209; 382/278
(58) Field of Classification Search ................. 382/128, 382/131, 209, 219, 278
See application file for complete search history.

(56) References Cited

U.S. PATENT DOCUMENTS 5,399,947 A * 3/1995 Washburn ................... 315/383
5,860,925 A * 1/1999 Liu ............................ 600/443
6,590,703 B2 * 7/2003 Park et al. .................... 359/372
7,084,951 B2 * 8/2006 Silverbrook ................. 355/18

FOREIGN PATENT DOCUMENTS

| JP | A 6-197260 | 7/1994 |
|---|---|---|
| JP | A 10-276350 | 10/1998 |
| JP | A 2001-86355 | 3/2001 |

* cited by examiner

*Primary Examiner*—Yosef Kassa
(74) *Attorney, Agent, or Firm*—Oliff & Berridge, PLC

(57) ABSTRACT

There is provided an image processing method that performs an image transformation operation on input image data using a computer to generate output image data for display, the image processing method including: acquiring input image data, generating transformed image data corresponding to a transformation process by performing each of a plurality of the transformation processes which are set corresponding to a transformation parameter representing a transformation operation on the acquired input image data; generating inverse-transformed image data by inverse-transforming the generated transformed image data into a shape corresponding to the input image data; determining deterioration of an image for each transformation process by comparing the generated inverse-transformed image data to the input image data, selecting an optimal transformation process among the plurality of transformation processes based on a result of the deterioration determination, and generating the output image data by performing a transformation operation on the input image data based on the optimal transformation process.

6 Claims, 6 Drawing Sheets

IMAGE PROCESSING METHOD, IMAGE PROCESSING PROGRAM, RECORDING MEDIUM, AND PROJECTOR

BACKGROUND

1. Technical Field

The present invention relates to an image processing method of transforming input image data to generate output image data for display, a program for allowing a computer to execute the method, a recording medium recording the program, and a projector.

2. Related Art

In projection-type display apparatuses such as projectors, in order to cope with display deformation due to gradient projection or the like, trapezoidal distortion correction functions are provided to transform input images in advance, so that rectangular images can be displayed correctly on projection faces.

In addition, in direct-view type image display apparatuses other than the projection-type display apparatuses, input images are enlarged or reduced to be displayed, However, there are cases where the quality of an output image is deteriorated compared to that of an input image when this kind of transformation is processed. For example, when a data component having a high spatial frequency is included in the input image data and the data component is transformed to have a higher spatial frequency, there may be a case where the transformed component becomes out of the display capacity of the display device.

In this case, a component having a high spatial frequency component is bent toward the low frequency side at the nyquist frequency of the display device to be viewed by an observer as a moire pattern, thereby deteriorating the image quality of an output image.

Although the reason for the occurrence of the moire is relatively simple as described above, It is very difficult to detect an occurrence of the moire in advance in, a practical application and to suppress the deterioration of the image quality to a minimal level.

In other words, in order to detect the occurrence of the moire in advance, the calculation of a performed transformation operation, input image data, and all the spatial frequency response characteristics of a display device are required. However, the amount of calculation is very large, which makes it impractical to detect the occurrence of the moire.

As a method of easily detecting the occurrence of the moire, for example, in a fixed pixel type image pickup device, a method in which a focus-matching image and a defocused image are compared and when there is a marked difference between the focus-matching image which includes high frequency data and the defocused image which doest not include high frequency data, it is automatically determined that the moire occurs is proposed (for example, see JP-A-6-197260 (paragraph [0033], FIG. 7), JP-A-10-276350 (paragraph [0020], FIG. 4), and JP-A-2001-86355 (paragraphs [0035] to [0037], FIG. 6)).

In the technology disclosed in JP-A-6-197260, when the occurrence of the moire is determined, a process of subtracting a moire component from the focus-matching data is performed. To be more specifically, the defocused image is subtracted from the focus-matching position image including the moire component, and the result of the subtraction is assumed to be a moire component, and the moire component is subtracted from the focus-matching position image for reducing the moire component.

On the other hand, in the technology disclosed in JP-A-10-276350, when the occurrence of the moire is determined, a process of subtracting a low frequency component of the moire component from the focus matching data in the frequency domain is performed. To be more specifically, a process of subtracting the frequency component of the moire is performed using a low band-limiting filter and a band-limiting filter for reducing the moire component.

In addition, when a grey scale image is converted into halftone dots, in order to detect the occurrence of a moire, a process of converting into two halftone dots is performed, wherein the correspondence with data is half phase out of phase in one halftone dot for halftoning and, and the two halftone data are compared with each other (for example, see JP-A-2001-86355). When the moire occurs, the phase is moved rapidly by the above-described process, and accordingly there is a marked difference between two images. The comparison is performed on an image on which a defocus process and an averaging process of the halftone dots have been performed, and accordingly, it is possible to detect the occurrence of the moire.

However, when the technologies disclosed in the JP-A-6-197260, JP-A-10-276350, and JP-A-2001-86355 are applied to an image display apparatus on a premise that a transformation operation is performed on the projection-type display apparatus or the like, there is the following problem.

In other words, according to the technologies in the past, an image in which the moire occurs and the target image basically have a same size and a same shape, so that the correlating the position or size of the moire to the target image can be easily performed, and accordingly, the technique of subtracting the occurred moire component from the target image can be easily applied.

On the other hand, since the moire of an image display apparatus such as a projection-type display apparatus is generated as a result of transformation and it is very difficult to correlate the position or size of the generated moire to input image data. As a result, it is very difficult to perform the process of subtracting the generated moire component from the input image data.

In addition, when the method of using a low-limiting filter or a band-limiting filter which is used in the technology disclosed in JP-A-10-276350 is used, it is impossible to differentiate a frequency component and a moire component which are inherently included in the input image data, and accordingly, there is a possibility of deterioration of the image quality.

SUMMARY

An advantage of some aspects of the invention is to provide an image processing method, an image processing program, a recording medium, and a projector which are capable of suppressing the deterioration of image quality due to a transformation operation of an output image in an image display apparatus, especially the deterioration of an image quality due to a moire.

According to an aspect of the invention, there is provided an image processing method that performs an image transformation operation on input image data using a computer to generate output image data for display, the image processing method comprising: acquiring input image data, generating transformed image data corresponding to a transformation process by performing each of a plurality of the transformation processes which are set corresponding to a transformation parameter representing a transformation operation on the acquired input image data, generating inverse-transformed image data by inverse-transforming the generated transformed image data into a shape corresponding to the input image data, determining deterioration of an image for each transformation process by comparing the generated inverse-transformed image data to the input image data, selecting an optimal transformation process among the plurality of transformation processes based on a result of the deterioration determination, and generating the output image data by performing a transformation operation on the input image data based on the optimal transformation process.

According to this aspect of the invention, since the degree of deterioration of an input image data and an inverse transformed image data obtained by inverse-transforming the transformed image data is determined by the determination of deterioration, the degree of change can be determined by comparing the inverse transformed image data to the input image data which is a correct image. Thus, it becomes possible to select a transformation process which has a least deterioration by the selecting of the transformation process, the deterioration of an image quality due to a moire and the like can be minimized, even after a transformation operation such as a trapezoidal correction or a scale conversion is performed.

According to the aspect of the invention, It is preferable that division of the input image data and the generated inverse-transformed image data into a plurality of regional image data may be performed after the generating the inverse-transformed image data, and the determination of the deterioration of an image and the selection of the transformation process may be performed for each regional image data.

In this case, since the determination of the deterioration of an image and the selection of the transformation process are performed for each regional image data divided in the division, the transformation process can be selected corresponding to the quality deterioration of a partial input image, thereby suppressing the deterioration of the whole quality image to a minimal level.

According to the aspect of the invention, it is preferable that the determination of deterioration of an image may include calculating an error between brightness values for a pixel of the Input image data and a pixel of the inverse-transformed image data corresponding to the pixel of the input image and calculating the summation of the error of the brightness values for all the pixels, and the selection of a transformation process may be selecting a transformation process having a least value of the error of the brightness which is calculated in the determination of deterioration of an image as the optimal transformation process.

In this case, since a transformation process can be selected by using a simple technique utilizing an error of the brightness, the processing load of an image processing apparatus such as a computer which performs image processing can be reduced.

The present invention may be implemented not only as the above-described image processing method but also as an image processing program which executes the image processing method in a computer or a computer readable recording medium, In this case, by installing the image processing program to a computer, the above-described advantage can be achieved.

According to an aspect of the invention, there is provided a projector comprising an optical modulation device that modulates light beams irradiated from a light source corresponding to input image data, a projection optical device that projects the light beams modulated by the optical modulation device on an enlarged scale, and an image processing device that processes the input image data. The image processing device includes a transformation operation unit that directs the transformation operation on the input image data, an input image data acquisition unit that acquires input image data, a transformed image data generation unit that generates transformed image data corresponding to a transformation process by performing each of a plurality of the transformation processes which are set corresponding to a transformation parameter representing a transformation operation on the acquired input image data, an inverse-transformed image data generation unit that generates inverse-transformed image data by inverse-transforming the generated transformed image data into a shape corresponding to the input image data, a deterioration determination unit that determines deterioration of an image for each transformation process by comparing the generated inverse-transformed image data to the input image data, a transformation process selection unit that selects an optimal transformation process among the plurality of transformation processes based on a result of the deterioration determination, and an output image data generation unit that generates the output image data by performing a transformation operation on the input image data based on the optimal transformation process.

In the aspect of the invention, it is preferable that the projector may further comprise a region division unit that divides the input image data and the generated inverse-transformed image data into a plurality of regional image data, and the deterioration determination unit and the transformation process selection unit may perform determination of deterioration and transformation process selection for each regional image data which has been divided by the region division unit.

In this case, the projector does not have the deterioration of an image quality due to moire based on the above-described operation, even after a transformation operation such as a trapezoidal correction is performed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the present invention will be described with reference to the accompanying drawings.

First Embodiment

Figure 1:
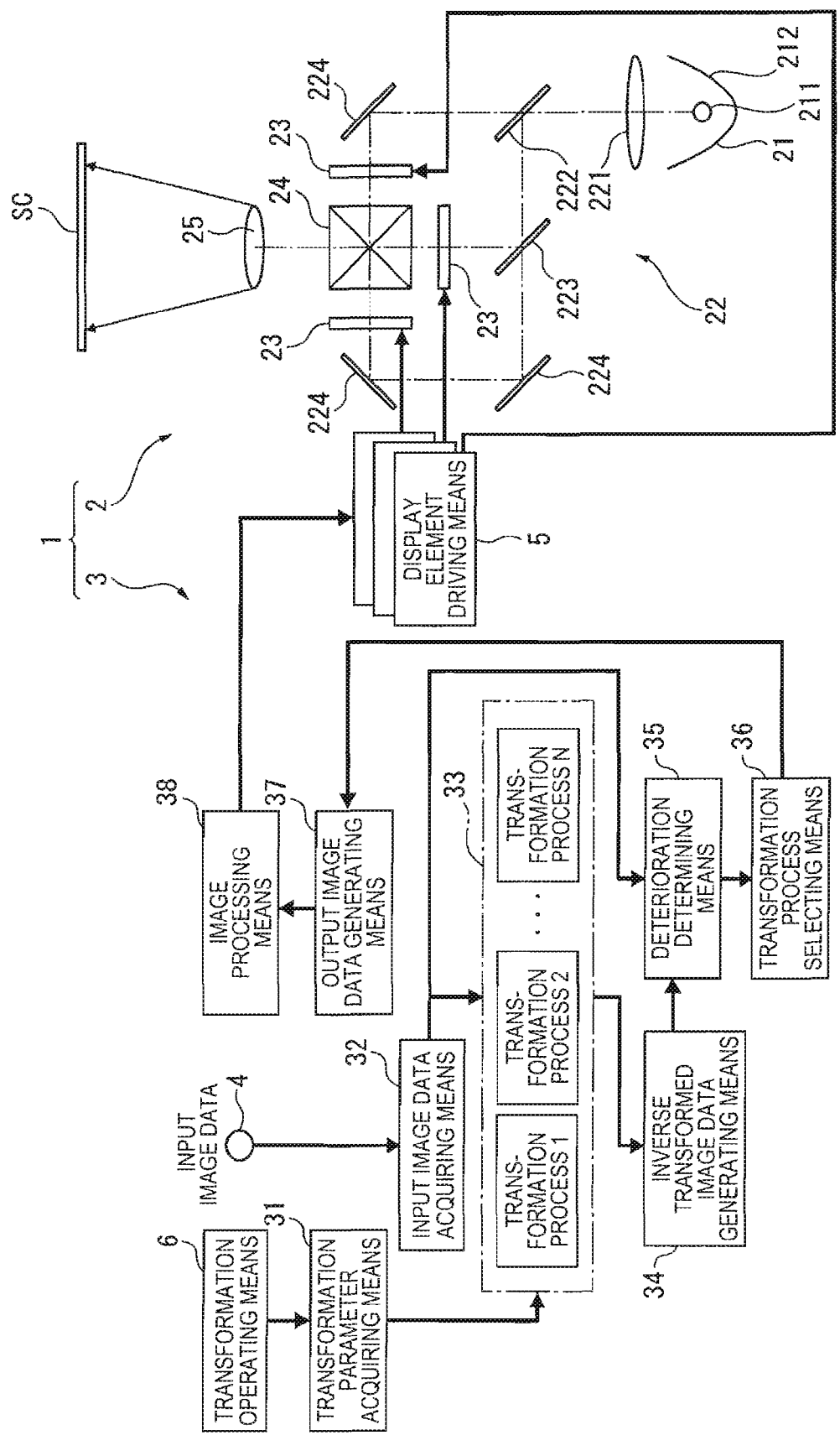
FIG. 1 is a schematic diagram showing a configuration of a projector according to a first embodiment of the invention.

FIG. 1 is a diagram showing a projector 1 as a projection-type display apparatus according to an embodiment of the invention. The projector includes an optical device 2 and an image processing device 3.

Configuration of Optical Device 2

The optical device 2 includes a light source lamp 21, an optical element 22 such as a condenser and a mirror, three liquid crystal panels 23 as an optical modulation element, a color composite optical element 24 such as a cross dichroic prism, and a projection lens 25. On the light beams irradiated from the light source lamp 21, brightness uniformization of the irradiated light in a face and color separation into three color lights of RGB are performed by the optical element 22 to provide each of the three color lights to the liquid crystal panels 23. Then, modulation corresponding to the input image data is performed on each of the three color lights by corresponding one of the liquid crystal panels 23, and three color lights are combined by the color composite optical element 24. Then, the combination of the three color lights is projected by the projection lens 25 on a screen SC on an enlarged scale.

The light source lamp 21 includes a discharge light emitting panel 211 such as an extra high voltage Mercury lamp and a reflector 212. The light beams irradiated from the discharge light emitting panel 211 are projected by the reflector 212 with the direction of the projection adjusted.

The optical element 22 includes an illumination optical element 221, dichroic mirrors 222 and 223, and a mirror 224.

The illumination optical element 221 performs brightness uniformization of the light in the face which is irradiated from the light source lamp 21 to overlap the uniformized light on an image forming area of the liquid crystal panel 23 which becomes an area to be illuminated. The illumination optical element 221 includes a multi lens array which includes a plurality of small lenses arranged in a planar matrix form and divides the illumination light from the light source lamp 21 into a plurality of partial light beams, a condensing lens which condenses the plurality of partial light beams which have been divided by the multi lens array to be overlapped on the image forming area of the liquid crystal panel 23.

The dichroic mirrors 222 and 223 are color-separation optical element which separates light which has been irradiated from the light source lamp 21 into each color light of R, G, or B. For example, a dichroic mirror 222 located in the front end of a light path is configured to pass red light and reflect the other color light, and a dichroic mirror 223 located in the rear end of the light path is configured to reflect green light and pass blue light. The mirror 224 bends each color light which has been separated by the dichroic mirrors 222 and 223 to provide each color light to the image forming area of the liquid crystal panel 23. Since a light path in the left side shown in FIG. 1 is longer than any other light path, generally, a relay optical system (not shown) is disposed in the rear end of the dichroic mirror 223.

The three the liquid crystal, panels 23 are optical elements, each of which modulates each color light which has been separated by the dichroic mirrors 222 and 223 in accordance with image data.

Each liquid crystal panel 23, which includes a fixed pixel-type image forming device, includes a plurality of fixed pixels disposed planar in the image forming area. The fixed pixel (not shown) uses TFT (thin film transistor) which applies a voltage to a liquid crystal sealed on a pair of transparent panels as a switching element. Since a voltage applied to each pixel is changed according to the switching of the TFT to change the alignment status of liquid crystals, it becomes possible to modulate the incident light beams based on the image data.

The color composite optical element 24 is an optical element of which a wavelength selection membrane is formed to have an approximate shape of a letter "X", when viewed from the top.

The light beams modulated by each liquid crystal panel 23 are combined by the color composite optical element 24 to form a color image.

The projection lens 25 is an optical element which projects the modulated light beams which have been modulated by the liquid crystal panel 23 on the screen SC on an enlarged scale. The projection lens 25 includes a plurality of groups of lens disposed inside a lens tube.

Configuration of Image Processing Apparatus 3

An image processing apparatus 3 performs image processing on input image data which is input from an image signal Input terminal 4 and drives the liquid crystal panel 23 based on the result of the image processing using a display element driving means 5 to form an appropriate image corresponding to the input image data.

The image processing apparatus 31 although not shown in the figure, includes a GPU (graphic processing unit) and a storage device such as memory which are installed on a main board being inserted into the projector 1. The image processing apparatus includes a transformation parameter acquiring means 31, an input image data acquiring means 32, a transformed image data generating means 33, an inverse transformed image data generating means 34, a deterioration determining means 35, a transformation process selecting means 36, an output image data generation unit 37, and an image processing means 33, as a program operating in the GPU. A program implementing each functional means may be installed in the projector In advance, but, for example, a program which is recorded in a recording medium such as a CD-ROM may be purchased to be installed in the projector 1.

The transformation parameter acquiring means 31 acquires a transformation parameter which provides an image transformation operation designated by a transformation operating means 6. The transformation operating means 6 includes an operation panel which is provided on an external case of the projector 1 or a switch in a remote controller. Examples of the transformation operation are trapezoidal deformation correction of the gradient projection of the projector 1, and enlargement or reduction of a part of a projected image. The transformation parameter which has been acquired by the transformation parameter acquiring means 31 is output to the transformed image data generating means 33.

The input image data acquiring means 32 acquires an input image data input from the image signal input terminal 4 arranged in the external case of the projector 1. The acquired input image data is output to the transformed image data generating means 33

The transformed image data generating means 33 performs a transformation process on the input image data which is acquired by input image data acquiring means 32 based on the transformation parameter acquired by the transformation parameter acquiring means 31. In the transformed image data generating means 33, a plurality of transformation processes 1 to N are prepared in advance corresponding to the transformation parameter.

A transformation process algorithm prepared for the transformed image data generating means 33 is a pixel interpolation algorithm for enlarging or reducing raster data such as a bitmap which is generally used in a GPU. Examples of the transformation process algorithms are a nearest neighbor method, a bi-linear method, and a by-cubic method.

The inverse transformed image data generating means 34 performs an inverse transformation on the transformed image data on which a transformation process is performed by the transformed image data generating means 33 into a size equivalent to the shape of the input image data. For example, when input image data including a rectangular image is transformed into trapezoidal transformed image data by a predetermined transformation process of the transformed image data generating means 33, the inverse transformed image data generating means 34 performs an inverse transformation on the trapezoidal transformed image data into a rectangular image data of a same size as the input image data to generate an inverse transformed image data.

The deterioration determining means 35 determines a degree of deterioration of an image quality by comparing input image data which is acquired by the input image data acquiring means 32 to inverse-transformed image data which is generated by the inverse transformed image data generating means 34.

In an embodiment of the invention, the determination for the degree of deterioration of image quality is performed by adding an error e of a brightness value for each pixel of the inverse transformed image data which is acquired by using equation 1 for all the pixels of the inverse transformed image data to calculate an evaluation value E which is calculated by using equation 2.

Equation 1:

$$e=0.299*r*r+0.587*g*g+0.144*b*b$$

Equation 2:

$$E=\Sigma e$$

The transformation process selecting means 36 selects a transformation process optimized for the transformation operation designated by the transformation operating means 6 based on an evaluation value E for each transformation process which is acquired by the deterioration determining means 35. According to an embodiment of the inventions a transformation process which has the least evaluation value E is to be selected.

The output image data generating means 37 performs a transformation process based on the transformation process which has been selected by the transformation process selecting means 36 to generate an output image data.

The image processing means 38 corrects brightness shading, color shading, VT-γ characteristics, or the like inherent in each pixel of the liquid crystal panel 23 based on output image data which has been generated by the output Image data generating means 37. The correction is performed by referring to an LUT (Look Up Table) which is configured corresponding to the difference of each pixel of the liquid crystal panel 23. The image processing means 38 converts 8-bit image signal of each color of RGB into a signal of 10-bit to 12-bit signal and outputs the converted, signal to the display element driving means 5 as a driving signal for each pixel.

Operation of Projector 1

Figure 2:
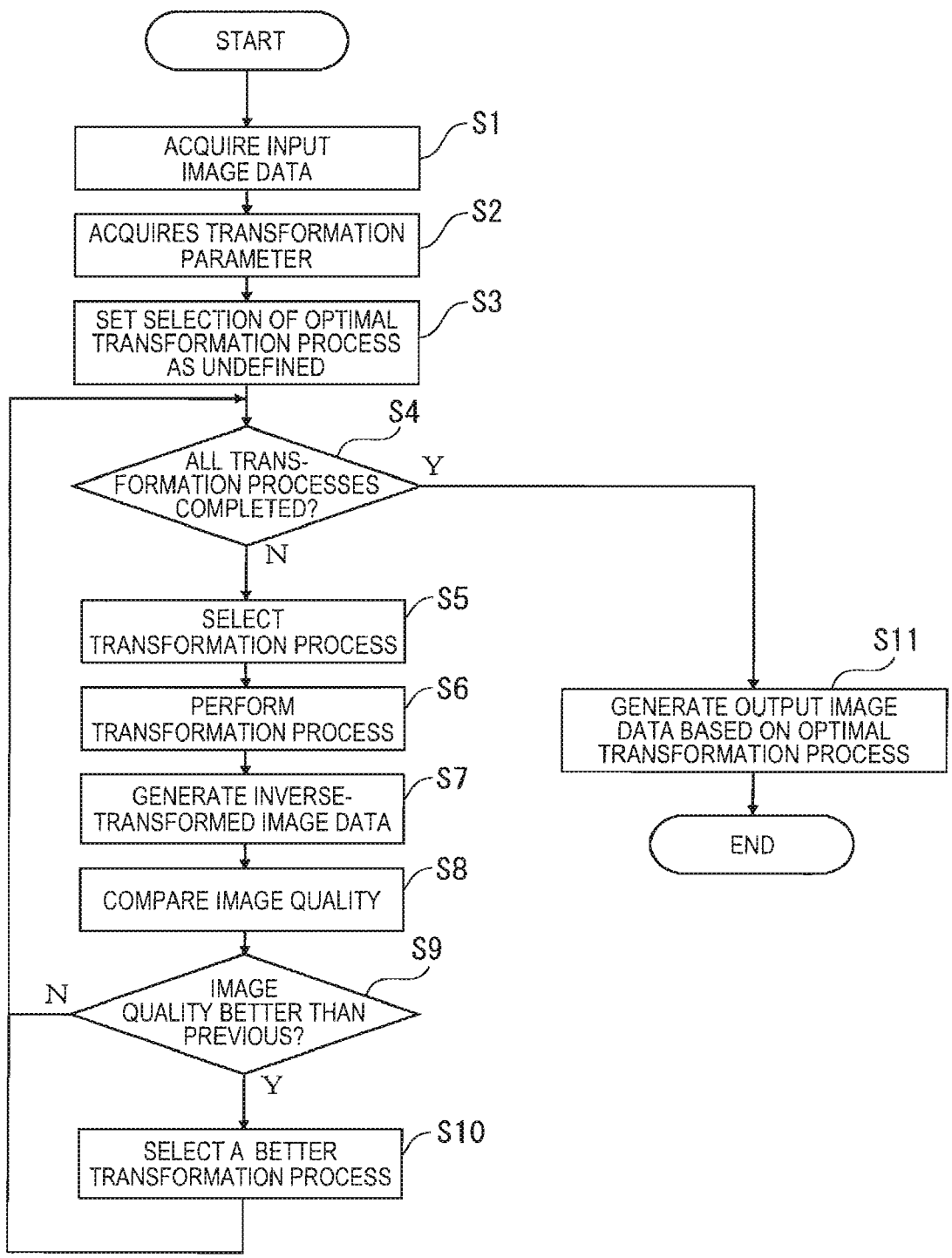
FIG. 2 is a flowchart for describing an operation according to the embodiment of the invention.

Hereinafter, the operation of an image processing apparatus 3 included in the above-described projector 1 will be described based on flowcharts shown in FIGS. 2 and 3.

(1) An input image data acquiring means 31 acquires input image data which is input from an image signal input terminal 4 and outputs the input image data to a transformed image data generating means 33 (process S1). A transformation parameter acquiring means 32 acquires a transformation parameter which represents a transformation operation such as a trapezoid transformation, a partial enlargement, a partial reduction, or the like which is selected by a user's operation of a transformation operating means 6 and outputs the acquired transformation parameter to the transformed image data generating means 33 (process S2).

(2) A transformed process selecting means 36 set a value of a flag that represents the transformation process which has been selected as the optimal transformation process to be undefined (process S3).

(3) While the transformed image data generating means 33 monitors whether the generation of image transformation data by all the transformation processes, that is, the plurality of transformation processes 1 to N which are set corresponding to the transformation parameter are completed (process S4), the transformed image data generating means 33 selects a transformation process corresponding to the transformation process (process S5) and generates transformed image data corresponding the transformation process (process S6).

(4) The inverse transformed image data generating means 34 transforms the transformed image data which is generated by the transformed image data generating means 33 to generate an inverse transformed image data having a same size as the input image data (process S7).

(5) Then the inverse transformed image data is generated, the deterioration determining means 35 compares the image qualities of the input image data and the inverse transformed image data (process S8).

Figure 3:
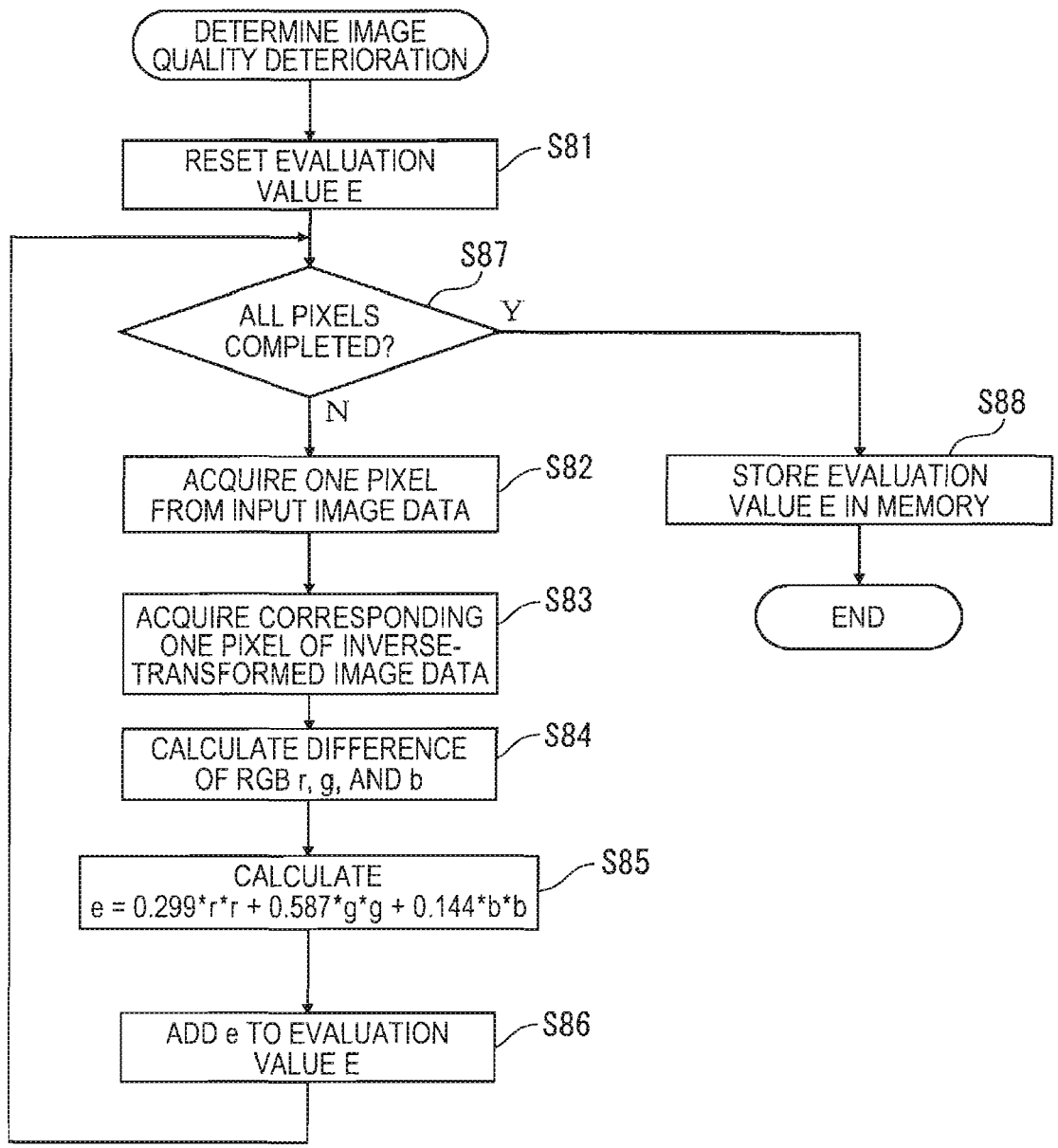
FIG. 3 is a flowchart for describing an operation according to the embodiment of the invention.

To be more specifically, for the comparison, as shown in the flowchart of FIG. 3, the deterioration determining means 35 resets the value of the evaluation E which is calculated using Equation 2 (process S81), at first and acquires RGB data for one pixel from the input image data (process S82), and acquires RGB data for one pixel corresponding to the pixel of the input image data from the inverse transformed image data (process S83)

Next, deterioration determining means 35 calculates the errors r, g, and b of RGB values for the two pixels (process S84), calculates an error e of brightness based on the errors r, g, and b by using Equation 1 (process S85), and adds the error e to the evaluation value E (process S86).

The deterioration determining means 35 repeats the calculation of the error e for another pixel of the input image data, updates the evaluation value E, and repeats the above processes until the errors e for all the pixels are added (process S87).

When the evaluation value E, to which the errors e for all the pixels are added, is calculated finally, the deterioration determining means 35 stores the evaluation value E in a storage area such as a memory (process S88).

(6) When the comparative evaluation of image quality for a predetermined transformation process is completed, the transformation process selecting means 36 compares a newly acquired evaluation value E and the previous evaluation value E which has been stored in the memory (process S9). Wheaten it is determined that the new evaluation value E is better than the previous evaluation value E, the transformation process selecting means 36 selects the transformation process as the optimal transformation process and updates the evaluation value E (process S10). On the other hand, when it is determined that the previous evaluation value E is better than the new evaluation value E, the processes S5 to S9 corresponding to the next transformation process are repeated while the previous evaluation value E is maintained.

(7) In the process S4, when all the transformation processes are completed, the transformation process selecting means 36 selects a transformation process corresponding to the remaining evaluation value E as an optimal transformation process. Then, the output image data generating means 37 performs the selected transformation process to generate an output image data (process S11), and the image processing means 38 performs an image process based on the optimized transformation process and drives the display element driving means 5 to display and form the image on a liquid crystal panel 38 which is a resultant image from performing the transformation operation on the input image data.

Now, the above-described operation will be described in more details with reference to FIG. 4.

Figure 4:
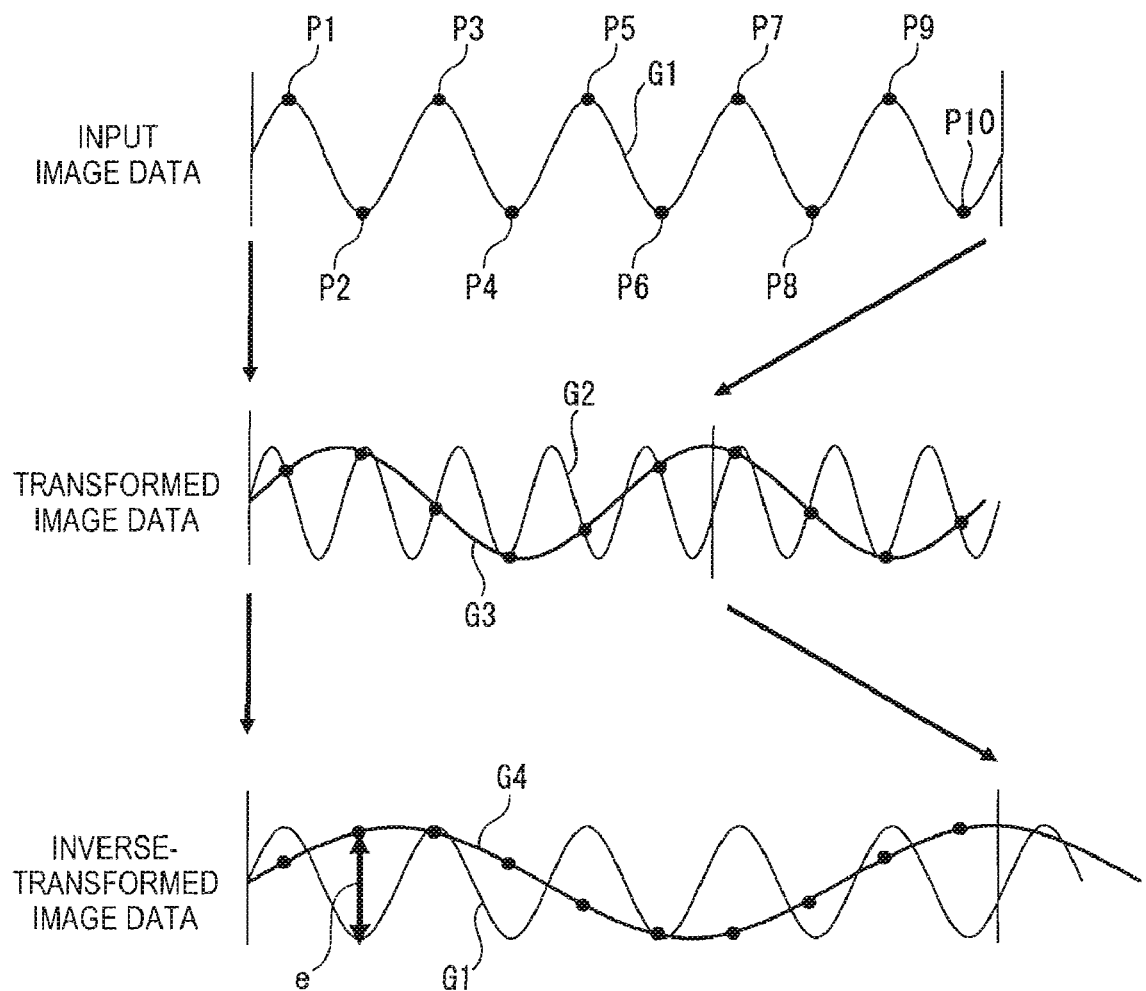
FIG. 4 is a graph schematic diagram for describing an operation according to the embodiment of the invention.

In other words, as shown in a graph G1 of FIG. 4, in pixels P1 to P10, in a status where input image data having a striped shape of repeating contrast density is input to an image processing apparatus 3, when a transformation process by which the input image data is shifted in a direction of increasing the spatial frequency, that is, a transformation process to transform the input image data to have a spatial frequency higher than the pitches of the pixels P1 to P10, as shown in a graph G2, is performed by the transformation operating means 6, a component having a frequency higher than the nyquist frequency is bent toward a lower frequency side so that the actually displayed data on the pixels P1 to P10 is as shown in a graph G3.

The inverse transformed image data generating means 34 transforms the input image data into data representing an image having a same size as the input image. However, the data of the graph G3 is not transformed back to the data of the graph G1 but transformed into data as a graph G4 which is an expanded graph of the graph G3. The deterioration determining means 35 calculates the summation of the error e of each pixel P1 to P10 on the generated graph G4 and set the evaluation value E to the resultant summation.

Since the transformation process selecting means 36 selects a transformation process which has the least value of the evaluation value E as an optimal transformation process, the deterioration of an image quality can be decreased after the transformation operation is performed.

Second Embodiment

Hereinafter, a second embodiment of the invention will be described. In the following description, a same part as the part described above is omitted.

In the above-described first embodiment, the determination of the deterioration determining means 35 and an optimal transformation process selection of the transformation process selecting means 36 are performed by comparing the whole input image data and the whole inverse transformed image data to calculate the evaluation value E.

Figure 5:
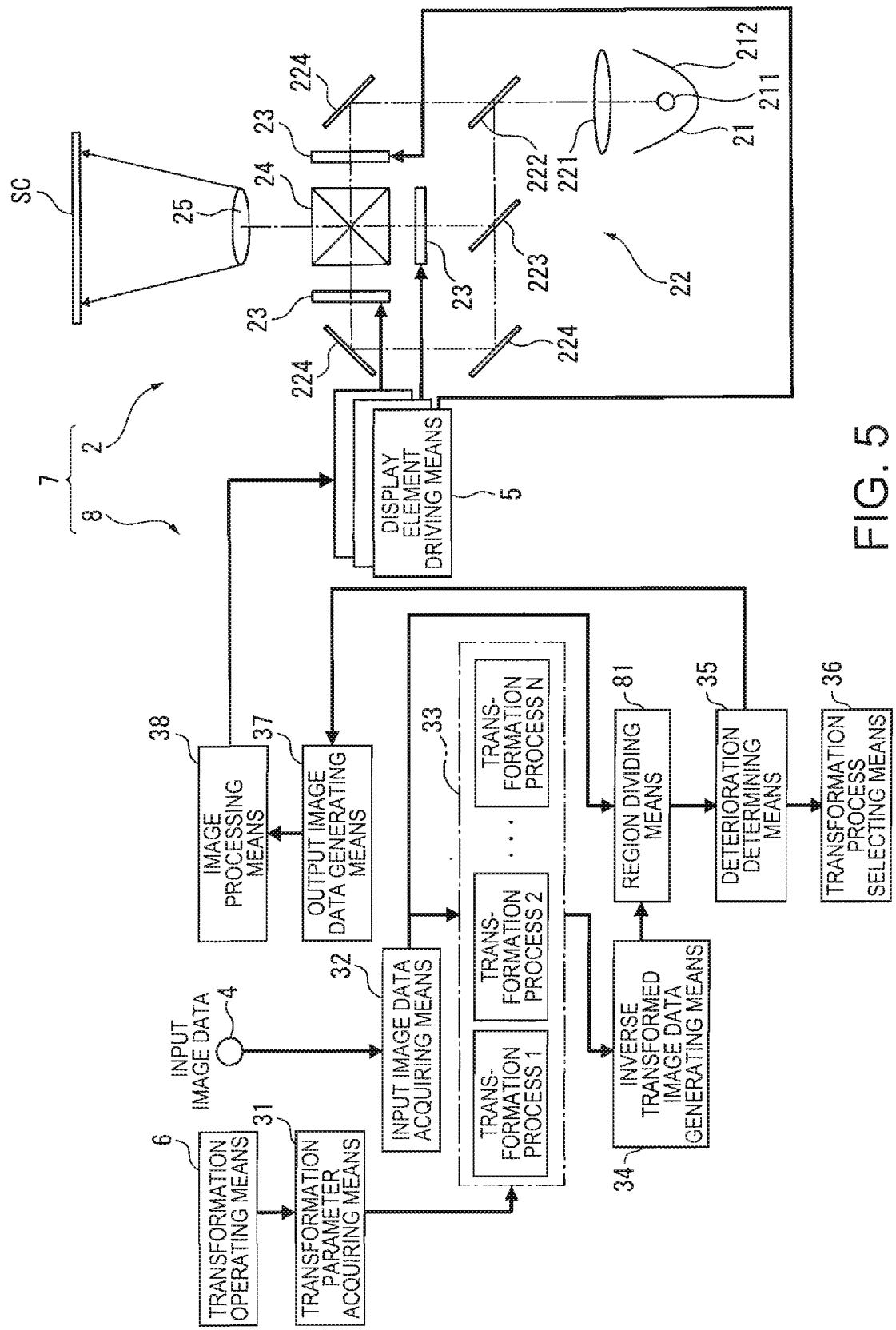
FIG. 5 is a schematic diagram showing a configuration of a projector according to a first embodiment of the invention.

On the other hand, In the projector 7 according to the second embodiment of the invention, as shown in FIG. 5, a region dividing means 81 is arranged in an image processing apparatus 8, and the determination of the deterioration determining means 35 and an optimal transformation process selection of the transformation process selecting means 36 are performed for each region divided by the region dividing means 81. Now, a detailed description focusing on a difference from the first embodiment will be followed.

In the projector 7 according to the embodiment of the invention, as shown in FIG. 5, the region dividing means 81 is disposed in a rear end of an inverse transformed image data generating means 34.

The region dividing means 81 has a function of dividing the input image data and the inverse transformed image data into a plurality of regions. When the input image data has a rectangular shape, the region dividing means 81 is configured to form each regional image data in a similar rectangular shape.

Figure 6:
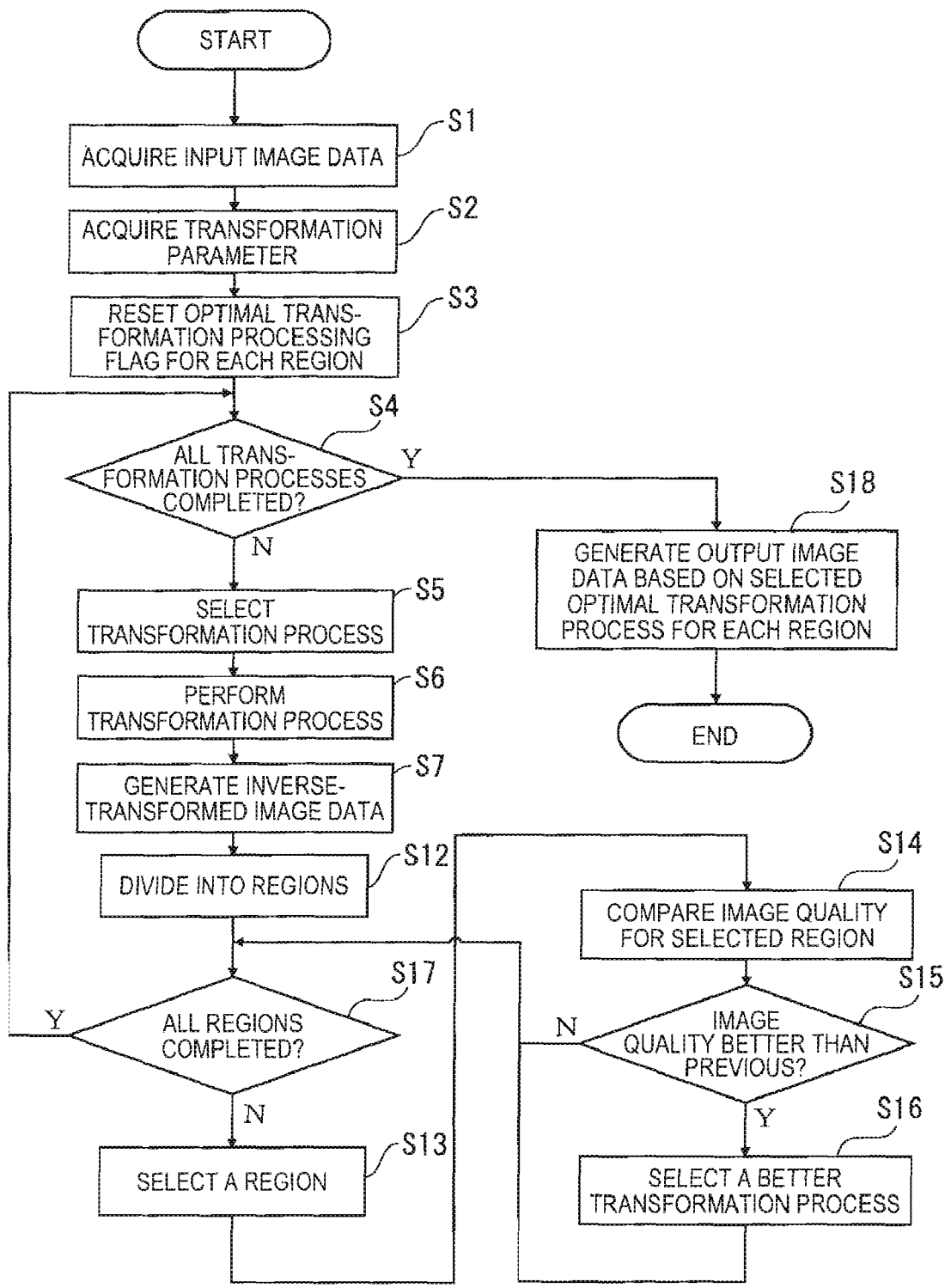
FIG. 6 is a flowchart for describing an operation according to the embodiment of the invention.

In the operation of the projector 7 which has the region dividing means 81, as shown in a flowchart of FIG. 6, processes of acquiring input image data S1 to the generating inverse transformed image data S7 are the same as those of the first embodiment. However, the subsequent processes are different from those of the first embodiment In other words, after the generation of the inverse transformed image data, the region dividing means 81 divides the input image data into a plurality of regional image data and divides the inverse transformed data into a plurality of regional image data so as to correspond to the regions of the input image data (process S12).

Next, a deterioration determining means 35 selects one of the divided regions (process S13) and compares the image quality between the input image data and the inverse transformed image data for the selected region (process S14). At this time, the processes for the comparative determination of the image quality are performed in a same order as that of the first embodiment.

The transformation process selecting means 36 selects a transformation process having a better evaluation value E based on the current evaluation value E and the previous evaluation value E for the region of the image data which is selected by the deterioration determining means 35 (process S16)

The deterioration determining means 35 performs a comparative determination for all the regions divided by the region dividing means 81, and the transformation process selecting means 36 selects a transformation process based on the comparative determination result, so that the calculation of the evaluation value E and selection of the transformation process are repeated for all the regions (process S17).

When the calculation of the evaluation value E and selection of the transformation process for the all regions are completed, generation of transformed image data and inverse transformed image data by the transformed image data generating means 33 according to the next transformation process to repeat the above-described processes S13 to S17.

When the selection of an optimal transformation process for all the region of the image data by the transformation process selecting means 36 is completed, the output image data generating means 37 performs a transformation process on the input image data according to a transformation process corresponding to each regional image data to generate an output image data (process S18).

According to the embodiment of the invention, the following advantage can be acquired in addition to the advantage described in the first embodiment of the invention.

Since the input image data is divided into a plurality of regional image data by the region dividing means 81 and the deterioration determination and the selection of the optimal transformation process are performed for each regional image data, a transformation process corresponding to a partial image deterioration of the input image data can be selected, and accordingly, the deterioration of the image quality as the whole image can be suppressed to a minimal level.

Modified Example

The present invention is not limited to the embodiments described above, but includes the following modifications.

In the above-described embodiments, the image processing method is performed in the projector 1, but the invention is not limited thereto, and the image processing method may be performed in a GPU which is installed in a computer, wherein the computer which can perform two-way digital communication and an image processing is connected to the projector.

In the embodiment described above, as an image forming display element, a liquid crystal panel is used, but the present invention is not limited thereto, and a self-luminous display element such as a PDP or an organic EL or an optical modulation element such as DLP using a micro mirror may be used as the image forming display element.

In addition, in the embodiments described above, a difference of RGB between the input image data and inverse transformed image data is calculated and the evaluation value E is acquired by performing summation of the difference as an error e of the brightness value, but the present invention is not limited thereto, and evaluation using a different characteristic value which can be evaluated may be performed.

In addition, the detailed configurations, forms, and the like may be changed in a scope in which the advantage of the invention can be attained, when the present invention is put into practice.

The entire disclosure of Japanese Patent Application No. 2006-38404, filed Feb. 15, 2006 is expressly incorporated by reference herein.

What is claimed is:

1. An image processing method that performs an image transformation operation on input image data using a computer to generate output image data for display, the image processing method comprising:
    acquiring input image data;
    generating transformed image data corresponding to a transformation process by performing each of a plurality of the transformation processes which are set corresponding to a transformation parameter representing a transformation operation on the acquired input image data;
    generating inverse-transformed image data by inverse-transforming the generated transformed image data into a shape corresponding to the input image data;
    determining deterioration of an image for each transformation process by comparing the generated inverse-transformed image data to the input image data;
    selecting an optimal transformation process among the plurality of transformation processes based on a result of the deterioration determination; and
    generating the output image data by performing a transformation operation on the input image data based on the optimal transformation process.

2. The image processing method according to claim 1, the method further comprising: dividing the input image data and the generated inverse-transformed image data into a plurality of regional image data after the generating the inverse-transformed image data, and wherein the determination of the deterioration of an image and the selection of the transformation process are performed for each regional image data.

3. The image processing method according to claim 1, wherein the determination of deterioration of an image includes calculating an error between brightness values for a pixel of the input image data and a pixel of the inverse-transformed image data corresponding to the pixel of the input image and calculating the summation of the error of the brightness values for all the pixels, and
    wherein the selection of a transformation process is selecting a transformation process having a least value of the error of the brightness which is calculated in the determination of deterioration, of an image as the optimal transformation process.

4. A computer readable recording medium that records an image processing program implementing a method that performs an image transformation operation on input image data to generate output image data for display in a computer allowing a computer to execute each of the steps of the method according to claim 1.

5. A projector comprising:
    an optical modulation device that modulates light beams irradiated from a light source corresponding to input image data;
    a projection optical device that projects the light beams modulated by the optical modulation device on an enlarged scale; and
    an image processing device that processes the input image data, wherein the image processing device includes:
    a transformation operation unit that directs the transformation operation on the input image data;
    an input image data acquisition unit that acquires input image data;
    a transformed image data generation unit that generates transformed image data corresponding to a transformation process by performing each of a plurality of the transformation processes which are set corresponding to a transformation parameter representing a transformation operation on the acquired input image data;
    an inverse-transformed image data generation unit that generates inverse-transformed image data by inverse-transforming the generated transformed image data into a shape corresponding to the input image data;
    a deterioration determination unit that determines deterioration of an image for each transformation process by comparing the generated inverse-transformed image data to the input image data;
    a transformation process selection unit that selects an optimal transformation process based on a result of the deterioration determination; and
    an output image data generation unit that generates the output image data by performing a transformation operation on the input image data based on the optimal transformation process.

6. The projector according to claim 5, further comprising a region division unit that divides the input image data and the generated inverse-transformed image data into a plurality of regional image data, and wherein the deterioration determination unit and the transformation process selection unit performs determination of deterioration and transformation process selection for each regional image data which has been divided by the region division unit.

* * * * *